United States Patent
Lee

(10) Patent No.: US 9,253,522 B2
(45) Date of Patent: Feb. 2, 2016

(54) METHOD FOR CONTROLLING DATA FLOW OF MIRROR LINK SYSTEM

(71) Applicant: Hyundai Motor Company, Seoul (KR)

(72) Inventor: Hwang Jik Lee, Incheon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/480,352

(22) Filed: Sep. 8, 2014

(65) Prior Publication Data
US 2015/0156533 A1    Jun. 4, 2015

(30) Foreign Application Priority Data
Dec. 4, 2013   (KR) .......................... 10-2013-0150018

(51) Int. Cl.
| H04N 7/18 | (2006.01) |
| H04N 21/414 | (2011.01) |
| H04N 21/214 | (2011.01) |
| H04N 21/41 | (2011.01) |
| G01C 21/36 | (2006.01) |
| H04N 21/45 | (2011.01) |

(52) U.S. Cl.
CPC .......... *H04N 21/41422* (2013.01); *G01C 21/36* (2013.01); *H04N 21/214* (2013.01); *H04N 21/4126* (2013.01); *H04N 21/4524* (2013.01)

(58) Field of Classification Search
USPC ........................................................... 725/75
See application file for complete search history.

(56) References Cited

U.S. PATENT DOCUMENTS

| 2007/0124041 A1* | 5/2007 | Kwon | H04N 21/4122 701/408 |
| 2010/0253864 A1* | 10/2010 | Fujinawa | G09G 3/3611 348/839 |
| 2014/0309870 A1* | 10/2014 | Ricci | G07C 9/00158 701/36 |

FOREIGN PATENT DOCUMENTS

| JP | 06-000974 U | 1/1994 |
| JP | 2005-286816 A | 10/2005 |
| JP | 2008-006832 A | 1/2008 |
| KR | 10-1017866 B1 | 3/2011 |
| KR | 10-1181737 B1 | 9/2012 |
| KR | 2013-0005234 A | 1/2013 |
| KR | 10-2013-0019066 A | 2/2013 |

* cited by examiner

*Primary Examiner* — Pinkal R Chokshi
*Assistant Examiner* — Alexander Gee
(74) *Attorney, Agent, or Firm* — McDermott Will & Emery LLP

(57) ABSTRACT

Flow of data is controlled in a mirror link system in which an AVN system included in a vehicle is interlinked with a wireless terminal. It is determined whether the vehicle is driven or not. Upon determining that the vehicle is not being driven (e.g., the vehicle is parked), the AVN system is interlinked with the wireless terminal through a first streaming protocol and a first control protocol. In contrast, upon determining that the vehicle is being driven, the AVN system is interlinked with the wireless terminal through a second streaming protocol and a second control protocol different from the first streaming protocol and the first control protocol. The first streaming protocol transmits video images and sounds associated with a video from the wireless terminal to the AVN system, while the second streaming protocol transmits only the sounds associated with a video from the wireless terminal to the AVN system.

8 Claims, 3 Drawing Sheets

METHOD FOR CONTROLLING DATA FLOW OF MIRROR LINK SYSTEM

CROSS-REFERENCE TO RELATED APPLICATION

This application is based on and claims priority from Korean Patent Application No. 10-2013-0150018, filed on Dec. 4, 2013 in the Korean Intellectual Property Office, the disclosure of which is incorporated herein in its entirety by reference.

BACKGROUND

1. Technical Field

The present invention relates to a method for controlling data of a mirror link system, and more particularly, to a method for controlling flow of data in a mirror link system capable of mirroring data between a wireless terminal and a vehicle's audio/video and navigation (AVN) system depending on whether the vehicle is driven or a position of a display.

2. Description of the Prior Art

Vehicles are being produced with increasingly sophisticated audio/visual and navigation systems. Audio/visual systems can include various advanced options, including multiple display screens positioned throughout the interiors of the vehicles and the capability to communicate with other devices. Navigation system may be built in to the vehicle, and may obtain various kinds of information such as information on traffic situations or road information that is frequently changed or updated while the vehicle is being driven. The navigation system typically provides a guide map to guide a driver to a destination. A combined audio/video and navigation system (hereinafter, referred to as an 'AVN' system) for a vehicle provides equipment which can both display TV or video and provide navigation services.

A front panel of the AVN is equipped with a monitor and an inside of the front panel is equipped with a car audio speaker, such that a user of a car may listen to music and view TV and moving pictures. Additionally, a wireless terminal (for example, a smart phone) carried by a user of a vehicle can be communicatively interlinked with the AVN of the vehicle, and thus the AVN of the vehicle may use and display information from various applications which are executed in the wireless terminal. Generally, however, only one AVN equipped monitor is installed in a vehicle and the one AVN displays only one picture (e.g., a still image or video image) at a time. Therefore, a driver and a passenger seated in a passenger seat must view the same picture. Further, in accordance with related regulations, a driver cannot view TV and moving pictures while driving a vehicle. As a result, the passenger seated in the passenger seat of the vehicle may be prevented from viewing television (TV) while a vehicle is driven.

SUMMARY OF THE INVENTION

Accordingly, the present invention has been made to solve the above-mentioned problems occurring in the prior art while advantages achieved by the prior art are maintained intact.

One subject to be achieved by the present invention is to provide a method for controlling flow of data in a mirror link system capable of controlling data transmitted from a wireless terminal to an AVN system depending on whether a vehicle is driven.

Another subject to be achieved by the present invention is to provide a method for controlling flow of data in a mirror link system capable of controlling data transmitted from a wireless terminal to an AVN system depending on whether a vehicle is driven or a position at which a display of an AVN is installed.

In one aspect of the present invention, there is provided a method for controlling flow of data in a mirror link system in which an AVN system included in a vehicle is interlinked with a wireless terminal. The method includes determining whether the vehicle is being driven or not. Upon determining that the vehicle is not being driver (e.g., the vehicle is parked), the AVN system is interlinked with the wireless terminal through a first streaming protocol and a first control protocol. Upon determining that the vehicle is being driven, the AVN system is interlinked with the wireless terminal through a second streaming protocol and a second control protocol different from the first streaming protocol and the first control protocol.

The first streaming protocol may transmit video images and sounds associated with a video from the wireless terminal to the AVN system, and the first control protocol may control the AVN system to output the video images and the sounds transmitted to the AVN system.

The second streaming protocol may transmit only the sounds associated with a video (and exclude the video images from the video) from the wireless terminal to the AVN system, and the second control protocol may control the AVN system to output a still image and the sounds transmitted to the AVN system.

The still image may be an image that was previously downloaded from the wireless terminal and stored in the AVN system of the vehicle, the AVN system may generate an image table identifying a plurality of stored images and transmit the generated image table to the wireless terminal, and the second control protocol may control the AVN system to output a still image based on an image index for the still image included in the image table.

The method for controlling flow of data in a mirror link system may further include, when a new image is updated or added in the wireless terminal, the wireless terminal informing the AVN system that there is a need to update or add the new image in the image table.

The AVN system may determine a specific image among the plurality of stored images based on an image index for the specific image in the image table and simultaneously output the determined specific image and the sound.

The AVN system may further continuously monitor whether the vehicle is being driven, and may adjust in real time the interlinking of the AVN system and the wireless terminal based on the continuous monitoring of whether the vehicle is being driven.

The wireless terminal may be a smart phone.

The interlinking between the AVN system and the wireless terminal may enable the AVN system to wirelessly receive audio and/or video data from the smart phone for output on one or more display screens or audio speakers of the AVN system.

Upon determining that the vehicle is being driven, the AVN system may outputs sounds associated with a video from the wireless terminal, and the second control protocol may control the AVN system to output a composite image including a still image received by the AVN system from the wireless terminal overlayed with a related image.

The still image may be an image that was previously downloaded from the wireless terminal and stored in the AVN system.

The AVN system may include a plurality of displays provided at a plurality of different positions in the vehicle. Upon determining that the vehicle is being driven, the second streaming protocol may transmit only the sounds associated with a video excluding the video images from the video from the wireless terminal to a display screen of the AVN system visible by the vehicle driver, and may transmit both the video images and the sounds to a display screen of the AVN system visible only by passengers other than the driver. The second control protocol may control the AVN system to output a still image along with the sound to the driver, and control the AVN system to output both the video images and the sound to the passengers other than the driver.

The still image may be an image that was previously downloaded to and stored in the AVN system of the vehicle from the wireless terminal, the AVN system may generate an image table identifying a plurality of stored images and transmit the generated image table to the wireless terminal, and the second control protocol may control the AVN system to output a still image to the driver based on an image index for the still image included in the image table.

The method for controlling data of a mirror link system may further include, when a new image is updated or added in the wireless terminal, the wireless terminal informing the AVN system that there is a need to update or add the new image in the image table.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
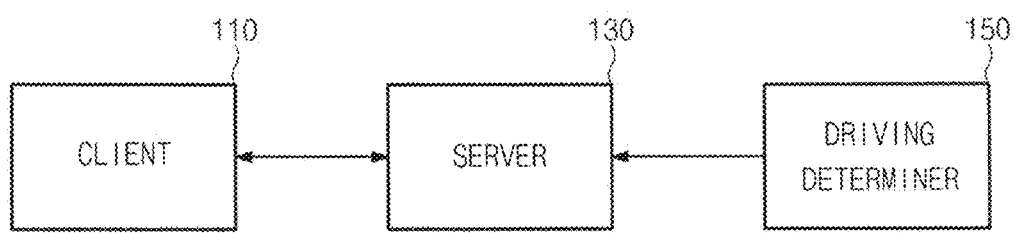
FIG. 1 is a diagram schematically illustrating a flow of data between components of a system executing a method for controlling data of a mirror link system according to an exemplary embodiment of the present invention.

Advantages and features of the present invention and methods to achieve them will be presented based on exemplary embodiments described below in detail with reference to the accompanying drawings. The present invention is not limited to the exemplary embodiments set forth herein, but may be modified in many different forms. These embodiments are provided so that this disclosure will be thorough and complete, and will fully convey the technical spirit of the invention to those skilled in the art.

The embodiments of the present invention are not limited to the illustrated specific forms shown in the drawings. The embodiments are presented in order to clearly explain and/or easily illustrate the present invention. Configurations of the present invention may be enlarged or otherwise not shown to scale in the accompanying drawings. Herein, specific terms have been used, but are just used for the purpose of describing the present invention and are not used for qualifying the meaning or limiting the scope of the present invention, which is disclosed in the appended claims.

In the present section, the terms 'and/or' are used as meaning including at least one of the components arranged before and after the term. Further, the expression 'connected/coupled' is used as including embodiments or situations in which the parts are directly connected with each other and embodiments or situations in which the parts are indirectly connected with each other with other elements interposed therebetween. Unless explicitly described to the contrary, a singular form includes a plural form in the present specification. In addition, components, steps, operations, and/or elements mentioned as "comprise" or "comprising" in the present specification do not exclude the existence or addition of one or more other components, steps, operations, and/or elements.

Hereinafter, exemplary embodiments of the present invention will be described in detail with reference to the accompanying drawings.

FIG. 1 is a diagram schematically illustrating a flow of data between components of a system executing a method for controlling data of a mirror link system according to an exemplary embodiment of the present invention. Referring to FIG. 1, a mirror link system includes a client 110, a server 130, and a driving determiner 150.

The client 110 provides or engages in data communication with the server 130. The client 110 further outputs data received from the server 130 through an output unit, such as a display unit and/or a sound output unit, which is provided in the client 110 and allows data processed by the server 130 to be output to a user. In detail, when the server 130 processes moving pictures such as a movie, a video image and a sound track of the corresponding movie may be provided to the user through the output unit (for example, a display unit and a sound output unit) which is located in the client 110. The video image and sound track may alternatively be provided to the user through an output unit which is located in other apparatuses (for example, in a client device or in the server 130) instead of being provided by the output unit which is located in the client 110.

Hereinafter, an illustrative example relating to a smart phone serving as a wireless terminal is described in detail. Many smart phones include relatively high performance central processing units that have more processing power and provide higher performance than central processing units of typical AVN systems equipped in vehicles. Further, a smart phone may provide data communication via a common carrier while moving at a higher rate than an AVN system. However, as the smart phone is a portable device, the size of the display for outputting video on a smart phone is generally smaller than that of a stationary display screen provided as part of an AVN system in a vehicle. The audio or sound system of a smart phone is also generally not as powerful as that of AVN system. Therefore, when a user possessing a smart phone gets in a vehicle, he/she may prefer to view and listen to the corresponding movie using an AVN system's display screen and audio system which are provided in the vehicle in view of having an improved viewing experience. A representative technology which may realize this is a mirror link.

Viewing the mirror link system from the viewpoint of the data communication shown in FIG. 1, the smart phone which processes and outputs data becomes the server 130. The AVN of the vehicle, which receives the data output from the smart phone and outputs the received data to the user through the output unit, becomes the client 110.

Referring to FIG. 1, the client 110 (e.g., the AVN system) and the server 130 (e.g., the smart phone) in the mirror link system transmit and receive data to and from each other bi-directionally. However, a main flow of data travels in a direction from the server 130 to the client 110. In particular, the method for controlling data of a mirror link system according to the exemplary embodiment of the present invention controls the flow of data between the server 130 and the client 110 depending on whether a vehicle is driven. Therefore, unlike a general mirror link system, the mirror link system described herein includes a driving determiner 150 that is operative to determine whether the vehicle is being driven. The driving determiner 150 may thus determine whether the vehicle is being driven or is parked, and provides the result of the determination to the server 130. Various methods can be used to determine whether the vehicle is being driven, and therefore all the examples thereof may not be described herein. However, as in the detailed example described below, the determination may be based on determining whether a vehicle wheel is in motion, whether a vehicle gear is in or has entered a drive mode, and the like, but the determining whether the vehicle is being driven is not limited to the examples described herein. Further, the driving determiner 150 may be implemented in a configuration in which the driving determiner 150 is included in the AVN system of the vehicle or is implemented as an apparatus that is separate and distinct from the AVN system.

Figure 2:
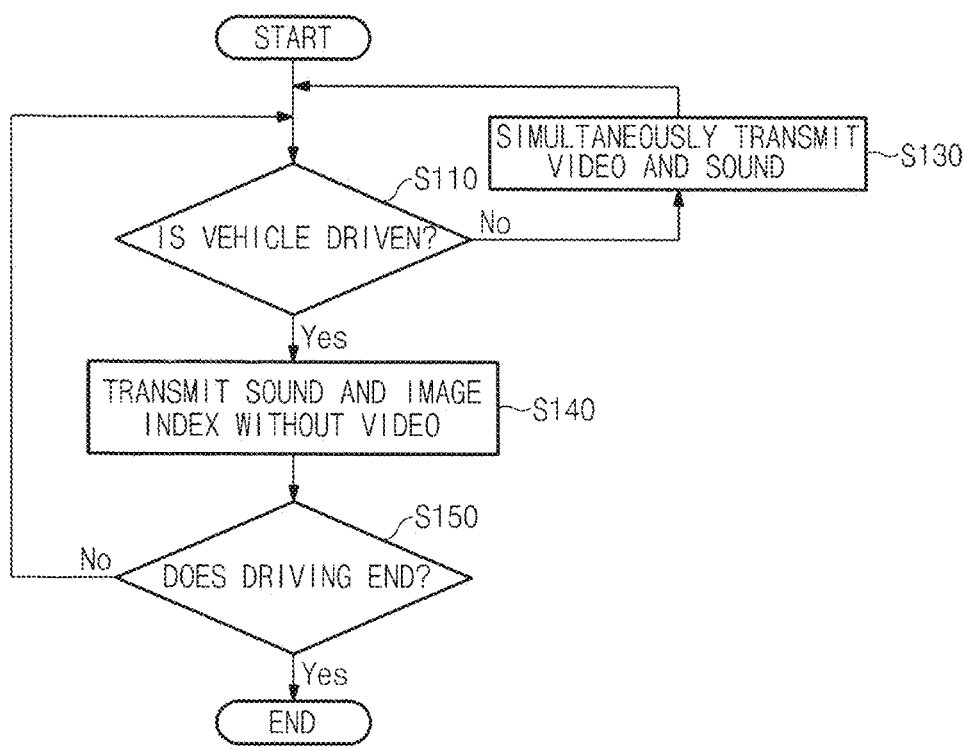
FIG. 2 is a flow diagram illustrating a process for controlling the flow of data in a mirror link system according to the exemplary embodiment of the present invention.

FIG. 2 is a flow diagram illustrating a process for controlling the flow of data in a mirror link system according to the exemplary embodiment of the present invention.

The method for controlling the flow of data in a mirror link system in which a wireless terminal is interlinked with the AVN system equipped in a vehicle begins with determining whether the vehicle is currently being driven or is not currently being driven (e.g., the vehicle is parked) (S110).

In step S110, based on the result of determining whether the vehicle is being driven, the system may operate in a first mode upon determining that the vehicle is not being driven (e.g., upon determining that the vehicle is parked). In the first mode, regulations and safety considerations relating to the operation of an AVN system in a vehicle that is being driven are not being violated, and therefore all of the video images and the sounds which are output from the wireless terminal are transmitted to the AVN system (S130) for display to the vehicle occupants. In particular, in the first mode, all of the videos, images, and sounds of the wireless terminal may be interlinked with and sent to the AVN system through a first streaming protocol and a first control protocol. In detail, the method for controlling flow of data in a mirror link system according to the exemplary embodiment of the present invention transmits all of the videos, images, and sounds output from the wireless terminal to the AVN system through the first streaming protocol in the first mode of operation, and a first control protocol may control the AVN system to output the video, images, and sound transmitted to the AVN system through the display and the sound output unit which are provided in or linked to the AVN system.

In step S110, based on the result of determining whether the vehicle is being driven, the system may alternatively operate in a second mode upon determining that the vehicle is being driven. The viewing of TV and moving pictures while the vehicle is being driven may violate related regulations and/or negatively affect the safety of driving the vehicle. As a result, in the second mode, only the sounds output from the wireless terminal are transmitted to the AVN system (S140) and output of the videos and images is suspended. In particular, in the second mode, the sounds of the wireless terminal are interlinked with and sent to the AVN system through a second streaming protocol and a second control protocol. Further, in the second mode, instead of the AVN system outputting video received from the wireless terminal, the AVN system outputs an appropriate image along with the sound output by and received from the wireless terminal. In detail, the method for controlling flow of data in a mirror link system according to the exemplary embodiment of the present invention transmits only the sounds excluding the videos from the videos and the sounds output from the wireless terminal through the second streaming protocol to the AVN system in the second mode of operation, and the second control protocol may control the AVN system to output an appropriate image through the display of the AVN system while controlling to output the sound transmitted to the AVN system through the sound output unit of the AVN system.

Next, when the driving of the vehicle ends, the process returns to the previous step of step S110 (S150). Further, steps S110 to S150 which are described above may be repeated depending on the driving of the vehicle.

Hereinafter, the second mode of operation will be described in more detail. As described above, the second mode of operation in used in situations in which the vehicle is being driven. In the second mode of operation, even though the wireless terminal is interlinked with the AVN system, only the sounds from the videos and the sounds output from the wireless terminal are transmitted to the AVN system of the vehicle. As a result, the viewing of moving pictures such as movie or TV is restricted for safety during driving of the vehicle. Instead of outputting a video image, the AVN system outputs an appropriate image along with the received sound depending on the control of the second control protocol.

According to the method for controlling flow of data in a mirror link system according to the exemplary embodiment of the present invention, the image output in the second mode may include one or more of a plurality of images corresponding to applications executed by the wireless terminal. The plurality of images may be previously downloaded to and stored in the vehicle's AVN system from the wireless terminal. In detail, the downloaded image may be stored in a memory which is included in the AVN system of the vehicle, but the exemplary embodiment of the present invention is not limited thereto.

Further, the AVN system may generate an image table including each of the plurality of stored images. The image table may include an image index which may specify each image stored in the memory. The image table (and image indexes) generated in the AVN system may be transmitted to the wireless terminal, and the second control protocol may perform a control to selectively specify and output identification for the image to be output along with the sound output from the AVN system during the second mode. The identification for the image to be output or displayed by the AVN system identifies the image index included in the image table for the specified image. In detail, upon receiving the second control protocol, the AVN system may determine the specific image to display from among the images previously stored in the memory of the vehicle based on the received image indexes and may simultaneously output the determined specific image along with the sound received through the second streaming protocol.

Figure 3:
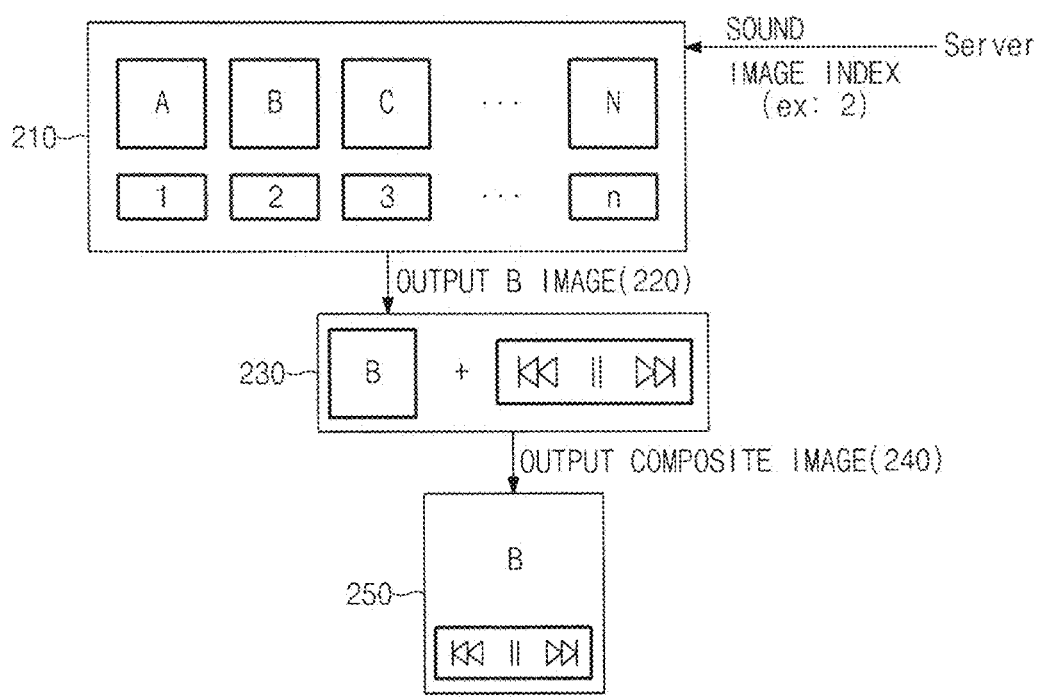
FIG. 3 is a diagram illustrating an example in which the method for controlling the flow of data in a mirror link system is implemented to mirror audio data according to the exemplary embodiment of the present invention.

FIG. 3 is a diagram illustrating an example in which the method for controlling the flow of data in a mirror link system is implemented to mirror audio data according to the exemplary embodiment of the present invention. An image table 210 stored in the memory of the vehicle includes a plurality of images A to N, and each image has an image index 1 to n which correspond to the image.

In detail, the process of generating and outputting the output of the display of the AVN system in the second mode includes the AVN system receiving sound (e.g., voice or other audio track) data and an image index (for example, image index 2) from the server (e.g., the wireless terminal such as a smart phone). The image table 210 specifies an image (for example, image B) corresponding to the received image index (e.g., image index 2), and the AVN system outputs the specified image B (220). A composite image 230 obtained by combining (e.g., overlaying) the output image B with a related image (for example, a rewind image showing arrows pointing backward, a temporary pause image, a fast forward image showing arrows pointing forward, or a play arrow image showing a single arrow pointing forward) can displayed at the same time that the sound is output from the AVN system (240). That is, the corresponding composite image 250 is output on the display of the AVN system of the vehicle while the sound corresponding to the specific image B is output. In this case, the corresponding composite image 250 is a still picture, and specifically is not a moving picture, and therefore does not affect the safety of driving the vehicle. Further, fewer resources are used in the second mode as compared to the resources used to simultaneously stream the video and the sound in real time, and therefore it is possible to reduce energy usage and communication bandwidth usage by the AVN system of the vehicle.

Further, according to the method for controlling flow of data in a mirror link system according to the exemplary embodiment of the present invention, when the images included in the applications executed by the wireless terminal are updated or a new image is added (e.g., in response to an application update, or to installation of a new application), the wireless terminal may inform the AVN system of the update and transmit the updated or new image to the AVN system so that the AVN system can update or add the new image to memory and to the image table.

Further, even when an AVN system includes a plurality of display screens provided at different positions in the vehicle including display screens for viewing only by passengers of the vehicle, the method for controlling the flow of data in a mirror link system according to the exemplary embodiment of the present invention may implement mirror link services which do not adversely affect the safety of driving of the vehicle. Specifically, the AVN system can provide different specialized video/image output on different ones of the display screens depending on whether a display screen is visible by the driver only or visible by passengers only. In this case, the data are controlled depending on a first mode and a second mode by determining whether the vehicle is being driven. Here, the first mode is the same as the above-mentioned first mode and therefore the detailed description thereof will be omitted.

Describing the second mode, display screens visible by the passengers other than the driver may simultaneously receive the video image and the sound through the AVN system. In contrast, display screen(s) visible by the driver receive only the sound through the AVN system even though the video and the sound are simultaneously output from the wireless terminal, and the related appropriate still image is provided along with the sound to the driver.

Describing in detail, in the second mode, the second streaming protocol transmits only the sounds (excluding the video images) from the videos output from the wireless terminal to the vehicle driver. Further, both the video images and the sounds are output from the wireless terminal and transmitted to the passengers other than the driver. Further, the second control protocol controls the sound transmitted to the driver and at the same time, controls an image to be output to the driver so that the image appropriately output through the AVN system to the driver is output along with the sound output from the wireless terminal. Further, the second control protocol controls both the video image and the sound to be output to the passengers other than the driver.

In the AVN system including the plurality of displays, when the images included in the applications executed by the wireless terminal are updated or when a new image is added, the wireless terminal may inform the AVN system of the updated or added image, and the updated or added image is transmitted to the AVN system for storage in memory.

Further, the AVN system may generate the image table including the plurality of stored images and the image indexes, and may transmit the generated image table to the wireless terminal. The second control protocol may perform a control to selectively specify and output the image to be output by the AVN system along with the sound output from the AVN system in the second mode to the vehicle driver based on the image indexes included in the image table. In detail, upon receiving instructions conforming to the second control protocol, the AVN system may determine the specific image to be displayed from among the images previously stored in the vehicle based on the received image index. The AVN system may then simultaneously output the determined specific image and the sound received through the second streaming protocol to the driver.

As described above, the method for controlling flow of data in a mirror link system according to the exemplary embodiment of the present invention determines whether the vehicle is being driven. The method can then interlink the video and the sound output from the wireless terminal with the AVN system when the vehicle stops, but interlink only the sound from the wireless terminal with the AVN system of the vehicle when the vehicle is being driven. The method can cause only an appropriate image to be displayed on the display of the AVN system when the vehicle is being driven. As the result, the real-time mirroring technology may be applied even to the AVN system of a low quality vehicle, and moving pictures are not provided to the driver in situations in which the vehicle is being driven. Therefore, with the help of the mirror link, safety may not be affected since visual distractions to the driver are reduced. Further, when the display of the AVN system is individually provided to passengers separately from the driver, the video and the sound may be provided to the passengers other than the vehicle driver in real time. As such, when a plurality of passengers are present in the vehicle, the individual mirror link service is provided to enable the passengers to view a video while listening to sound output while only the sound output and a still image are provided to the driver.

According to the method for controlling flow of data in a mirror link system according to the exemplary embodiments of the present invention, it is possible to control the data transmitted from the wireless terminal to the AVN depending on whether the vehicle is being driven.

Further, it is possible to control the data transmitted from the wireless terminal to the AVN depending on whether the vehicle is being driven and the position at which the display of the AVN is installed.

Hereinabove, although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto. Considering the above contents, if the modifications and changes of the present invention belong to the range of the following claims and equivalents, the present invention is considered to include the changes and modifications of the present invention.

What is claimed is:

1. A method for controlling flow of data in a mirror link system in which an audio/video navigation (AVN) system included in a vehicle is interlinked with a wireless terminal, comprising:
   deteimining whether the vehicle is being driven or not;
   upon determining that the vehicle is not being driven, interlinking the AVN system with the wireless terminal through a first streaming protocol and a first control protocol, the first streaming protocol transmitting video images and sounds associated with a video from the wireless terminal to the AVN system, and the first control protocol controlling the AVN system to output the video images and the sounds transmitted to the AVN system; and
   upon determining that the vehicle is being driven, interlinking the AVN system with the wireless terminal through a second streaming protocol and a second control protocol different from the first streaming protocol and the first control protocol, the second streaming protocol transmitting only the sounds associated with the video from the wireless terminal to the AVN system, and the second control protocol controlling the AVN system to output a still image and the sounds transmitted to the AVN system,
   wherein the AVN system stores a plurality of images that were previously downloaded from the wireless terminal, and the AVN system generates an image table comprising image indexes identifying each of the plurality of images and transmits the generated image table to the wireless terminal, and wherein the second control protocol comprises an image index identifying the still image and the still image is output based on the image index.

2. The method according to claim 1, further comprising:
   when an image is updated or a new image is added in the wireless terminal, the wireless terminal informing the AVN system that there is a need to update the image or add the new image to the image table.

3. The method according to claim 1, wherein the AVN system determines the still image among the plurality of stored images based on the image index received from the wireless terminal and simultaneously outputs the determined still image and the sounds.

4. The method according to claim 1, further comprising:
   continuously monitoring whether the vehicle is being driven; and
   adjusting in real time the interlinking of the AVN system and the wireless terminal based on the continuous monitoring of whether the vehicle is being driven.

5. The method according to claim 1, wherein the wireless terminal is a smart phone.

6. The method according to claim 5, wherein the interlinking between the AVN system and the wireless terminal enables the AVN system to wirelessly receive audio and/or video data from the smart phone for output on one or more display screens or audio speakers of the AVN system.

7. The method according to claim 1,
   wherein the second control protocol controls the AVN system to output the still image overlayed with a related image.

8. The method according to claim 1, wherein the AVN system includes a plurality of displays provided at a plurality of different positions in the vehicle, and wherein:
   upon determining that the vehicle is being driven, the second streaming protocol transmits only the sounds associated with the video excluding the video images from the video to a display screen of the AVN system visible by the vehicle driver, and transmits both the video images and the sounds to a display screen of the AVN system visible only by passengers other than the driver, and
   the second control protocol controls the AVN system to output the still image along with the sounds to the driver, and controls the AVN system to output both the video images and the sounds to the passengers other than the driver.

* * * * *